United States Patent

Wooldridge

Patent Number: 5,961,680
Date of Patent: Oct. 5, 1999

[54] INTERNALLY COOLED GLASS GOB DEFLECTOR

[75] Inventor: Larry J. Wooldridge, Godfrey, Ill.

[73] Assignee: Owens-Brockway Glass Container Inc., Toledo, Ohio

[21] Appl. No.: 09/009,416

[22] Filed: Jan. 20, 1998

[51] Int. Cl.$^6$ ................................................. C03B 7/14
[52] U.S. Cl. ........................... 65/304; 65/225; 65/303; 65/355; 65/356
[58] Field of Search .................... 65/225, 303, 304, 65/355, 356

[56] References Cited

U.S. PATENT DOCUMENTS

| | | | |
|---|---|---|---|
| 653,848 | 7/1900 | Sheppard | 65/356 |
| 1,353,115 | 9/1920 | Hunter | 65/304 |
| 1,573,273 | 2/1926 | Pleukharp | 65/355 |
| 2,116,284 | 4/1938 | Ross . | |
| 2,515,738 | 7/1950 | Slayter et al. | 65/356 |
| 3,198,616 | 8/1965 | Havens . | |
| 3,340,038 | 9/1967 | Hartman . | |
| 3,895,931 | 7/1975 | Hamilton | 65/304 |
| 4,436,544 | 3/1984 | McCausland | 65/374 |
| 4,529,431 | 7/1985 | Mumford . | |
| 4,718,933 | 1/1988 | Suomala et al. . | |
| 4,772,306 | 9/1988 | Davey et al. . | |
| 5,394,910 | 3/1995 | Sweetland | 65/304 |
| 5,511,593 | 4/1996 | Sweetland | 65/304 |
| 5,735,925 | 4/1998 | Scott | 65/356 |
| 5,766,299 | 6/1998 | Miller | 65/261 |

FOREIGN PATENT DOCUMENTS

| | | | |
|---|---|---|---|
| 537911 | 5/1955 | Belgium | 65/304 |
| 2 008 741 | 10/1970 | Germany . | |
| 54-68817 | 6/1979 | Japan | 65/304 |
| 118585 | 5/1918 | United Kingdom | 65/304 |

OTHER PUBLICATIONS

Green, Donald. Perry's Chemical Engineer's Handbook, 6th Edition, pp. 11–6 to 11–8, 1984.

*Primary Examiner*—Peter Chin
*Assistant Examiner*—Michael P. Colaianni

[57] ABSTRACT

A deflector assembly for conveying gobs of molten glass to a glass forming machine, the deflector assembly having a longitudinally extending deflector formed from a suitable metallic material by casting with a cross-sectional configuration of a downwardly facing U. The deflector has a cooling passage formed internally of the metallic material and extending therethrough, the cooling passage being formed along the centerline of the deflector and adjacent to a bight of the U. The deflector assembly further comprises a thin-walled tube inserted into the cooling passage of the deflector, the thin-walled tube extending through the deflector, and a coolant is circulated through the thin-walled tube to thereby cool the deflector.

8 Claims, 1 Drawing Sheet

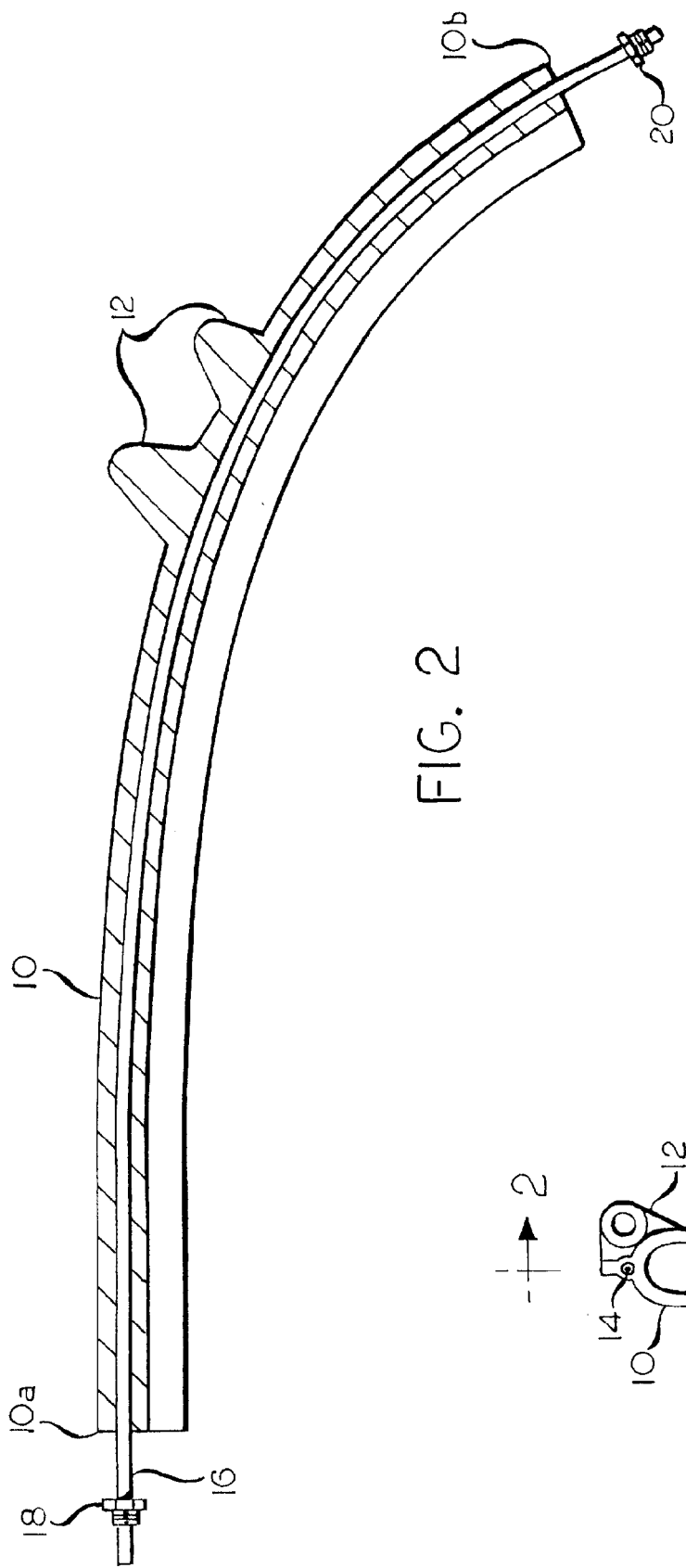

INTERNALLY COOLED GLASS GOB DEFLECTOR

BACKGROUND OF THE INVENTION

1. Field of the Invention

This invention relates to a deflector of the type used in the transfer of gobs of molten glass to a blank mold of a glass container manufacturing machine of the individual section ("I.S.") type. More particularly, this invention relates to a deflector of the aforesaid type that has a cooling passage formed integrally therein and extending therethrough.

2. Description of the Prior Art

A system for the delivery of gobs of molten glass to the various sections of an I.S. machine is generally described in U.S. Pat. 4,772,306 (Davey et al.), the disclosure of which is incorporated by reference herein. The system uses, for each mold cavity of each I.S. machine section, a fixed, downwardly inclined, upwardly facing straight trough that receives gobs, in sequence, from an oscillating scoop, which oscillates between a plurality of such troughs to feed gobs into each of them. Gobs exit from an outlet of each trough and then pass into a fixed device, called a deflector, that faces downwardly and is curved downwardly toward its outlet to guide the gobs as they pass from the trough into an I.S. machine section blank mold.

It is desirable to cool at least some of the deflectors in an I.S. machine gob delivery system to reduce the coefficient of friction between the deflector(s) and the gobs of glass passing therethrough, to thereby speed up the passage of gobs through the cooled deflector(s) and thereby more accurately control the arrival times of the gobs at the I.S. machine section mold cavity to which they are being directed. This is especially important in I.S. machines with a large plurality of sections, such as eight or even ten sections, because the gob travel paths to the molds at the outermost of such sections are considerably longer than the travel paths to the interior sections of the I.S. machine. Heretofore, it has been proposed to cool I.S. machine gob deflectors by adding cooling tubes or other elements to the exterior thereof, but the addition of such cooling elements complicates the manufacture of the deflector and adds to the expense thereof, consequently, this arrangement has not gained widespread acceptance.

SUMMARY OF THE INVENTION

According to the present invention there is provided an internally cooled deflector for use in the sequential transfer of gobs of molten glass to a blank mold of a section of an I.S. glass forming machine. The deflector according to the present invention is formed by casting from a suitable metallic material, for example, cast iron or an aluminum alloy, and is provided with a cooling passage extending longitudinally therethrough by incorporating a tube or core in the mold used to cast the deflector. The deflector, thus, has an internal cooling passage as cast, and does not require extra elements to be added to the exterior thereof to achieve a suitable degree of cooling. The use of such deflector, when provided with a means for causing cooling air to pass through the internal passage thereof, serves to present the gobs of glass at the I.S. machine section blank mold at a more closely controlled schedule, which helps to improve the consistency of the quality of containers being formed from gobs passing through the deflector.

Accordingly, it is an object of the present invention to provide an improved deflector for use in transferring gobs of molten glass to a blank mold of the I.S. glass container forming machine section. More particularly, it is an object of the present invention to provide a deflector of the foregoing character that has a coolant flow passage extending entirely through the interior of the deflector.

For a further understanding of the present invention and the objects thereof, attention is directed to the drawing and the following brief description thereof, to the detailed description of the preferred embodiment and to the appended claims.

BRIEF DESCRIPTION OF THE DRAWING

FIG. 1 is a fragmentary end view of a deflector according to the preferred embodiment of the present invention; and FIG. 2 is a sectional view taken on line 2—2 of FIG. 1.

DESCRIPTION OF THE PREFERRED EMBODIMENT

A deflector according to the preferred embodiment of the present invention is identified by reference numeral 10 in the drawing, and, as is shown in FIG. 2, the deflector 10 extends longitudinally from an inlet end 10a to an outlet end 10b. The inlet end 10a of the deflector 10 receives gobs of molten glass from a trough (not shown) of a glass gob delivery system, and the gobs of molten glass pass from the outlet end 10b of the deflector 10, which is positioned in use well below the inlet end 10a, into a blank mold (not shown) of an I.S. glass forming machine. As is shown in FIG. 1, the deflector 10 has the cross-sectional configuration of a downwardly facing U, and as is shown if FIG. 2, the deflector 10 is curved in an ever decreasing radius of curvature as it approaches its outlet end 10b to retain gobs of glass passing therethrough by centrifugal force, notwithstanding that the gobs would otherwise be free to fall from the deflector 10 because of its downwardly facing U-shaped cross-sectional configuration. The deflector 10 is formed by casting from a material that is able to withstand repeated contact with molten glass gobs, whose temperatures, for the types of soda-lime-silica glass compositions that are widely used in the manufacture of glass containers for various food and beverage packaging applications, may be of the order 2,000° F. In that regard, it is known to form prior art deflectors from cast iron or a cast aluminum alloy, and it is to be understood that the deflectors corresponding to the present invention may be formed by casting from either of such materials.

The deflector 10, which is provided with spaced-apart mounting lugs 12 along its length to facilitate the mounting of the deflector 10 in a fixed position relative to an I.S. machine section blank mold, has an integral passage 14 extending along the centerline of the deflector 10 and adjacent to the bight or apex of the U of its cross-sectional configuration. Cooling air is caused to pass through the passage 14, for example, by inserting a thin-walled cylindrical tube 16 in the passage 14 and extending completely therethrough, the cylindrical tube 16 being provided with fitments 18, 20 near the inlet end 10a and the outlet end 10b of the deflector 10, respectively. By passing cooling air, or other coolant, through the cylindrical tube 16, the deflector 10 will be cooled to thereby reduce the coefficient of friction of the deflector 10 to the passage of glass gobs in contact therewith, which will thereby reduce the residence times of the glass gobs in the deflector 10.

Although the best mode contemplated by the inventor for carrying out the present invention as of the filing date hereof has been shown and described herein, it will be apparent to those skilled in the art that suitable modifications, variations and equivalents can be made without departing from the scope of invention, such scope being limited solely by the terms of the following claims and the legal equivalents thereof.

What is claimed is:

1. In combination with a glass container forming machine of the individual section type having a plurality of side by side glass container forming sections, a longitudinally extending deflector for delivering gobs of molten glass to a section of the glass forming machine from a single source of gobs for all sections of said machine, said deflector comprising a cross-sectional configuration of a downwardly facing U, having an inner gob guiding surface, and being formed from a suitable metallic material by casting, said deflector having a cooling passage formed internally of the metallic material and extending longitudinally therethrough, the passage of cooling air through said cooling passage serving to reduce the residence times of the gobs in said deflector and means for delivering said gobs to said inner gob guiding surface of said deflector.

2. The combination according to claim 1 wherein said cooling passage of said deflector is positioned along a centerline of said deflector and adjacent to a bight of the U of its cross-sectional configuration.

3. The combination according to claim 2 wherein said deflector has an inlet end and an outlet end and has a downwardly curved portion at said deflector's outlet end.

4. The combination according to claim 3 wherein said metallic material is selected from the group consisting of cast iron and cast alloys of aluminum.

5. In combination with a glass container forming machine of the individual section type having a plurality of side by side glass container forming sections, a deflector assembly for delivering gobs of molten glass to a section of the glass forming machine from a single source of gobs for all sections of said machine, said deflector assembly comprising:

a longitudinally extending deflector having a cross-sectional configuration of a downwardly facing U, having an inner gob guiding surface, and being formed from a suitable metallic material by casting, said deflector having a passage formed within the suitable metallic material and extending longitudinally therethrough;

a thin-walled tube in said passage and extending therethrough; and means for causing a coolant to flow through said tube from an inlet end of said tube to an outlet end of said tube, the passage of cooling air through said thin-walled tube serving to reduce the residence times of the gobs in said deflector an means for delivering said gobs to said inner gob guiding surface of said deflector.

6. A combination according to claim 5 wherein said passage of said deflector is positioned along a centerline of said deflector and adjacent to a bight of the U of its cross-sectional configuration.

7. A combination according to claim 6 wherein said deflector has an inlet end and an outlet end and has a downwardly curved portion at said deflector's outlet end.

8. A combination according to claim 7 wherein said metallic material is selected from the group consisting of cast iron and cast alloys of aluminum.

\* \* \* \* \*